(12) United States Patent
Li et al.

(10) Patent No.: US 11,489,598 B2
(45) Date of Patent: Nov. 1, 2022

(54) OVER-THE-AIR CHANNEL STATE INFORMATION ACQUIREMENT FOR A MASSIVE MIMO CHANNEL EMULATOR WITH OVER-THE-AIR CONNECTION

(71) Applicants: Boyu Li, Irvine, CA (US); Ping Liang, Newport Coast, CA (US); Dengkui Zhu, Beijing (CN)

(72) Inventors: Boyu Li, Irvine, CA (US); Ping Liang, Newport Coast, CA (US); Dengkui Zhu, Beijing (CN)

(73) Assignee: RF DSP Inc, Irvine, CA (US)

( * ) Notice: Subject to any disclaimer, the term of this patent is extended or adjusted under 35 U.S.C. 154(b) by 959 days.

(21) Appl. No.: 16/091,985

(22) PCT Filed: Apr. 21, 2017

(86) PCT No.: PCT/US2017/028848
§ 371 (c)(1),
(2) Date: Oct. 7, 2018

(87) PCT Pub. No.: WO2017/189355
PCT Pub. Date: Nov. 2, 2017

(65) Prior Publication Data
US 2019/0115988 A1 Apr. 18, 2019

Related U.S. Application Data

(60) Provisional application No. 62/327,753, filed on Apr. 26, 2016.

(51) Int. Cl.
*H04B 17/10* (2015.01)
*H04B 7/0452* (2017.01)
(Continued)

(52) U.S. Cl.
CPC ......... *H04B 17/101* (2015.01); *H04B 7/0452* (2013.01); *H04B 7/0617* (2013.01);
(Continued)

(58) Field of Classification Search
CPC .. H04B 7/0413; H04B 7/0452; H04B 17/101; H04B 17/12; H04B 17/21;
(Continued)

(56) References Cited

U.S. PATENT DOCUMENTS

2010/0008281 A1* 1/2010 Balachandran ....... H04L 1/0631
370/312
2011/0244807 A1* 10/2011 Yoon ................. H04W 56/0035
455/67.11
(Continued)

*Primary Examiner* — Sophia Vlahos
(74) *Attorney, Agent, or Firm* — George Guosheng Wang; United States Research and Patent Firm

(57) ABSTRACT

This invention presents a channel emulator for testing a multi-user multiple input multiple output (MU-MIMO) wireless communication system using an over-the-air (OTA) connection between the antennas of a base station (BS) and the channel emulator. It uses pilot signals with special structures to estimate the channel matrix between the BS and the channel emulator, equalizes the channel when performing emulation of the channels between the BS and a plural of user equipment (UEs) in MU-MIMO communication.

24 Claims, 8 Drawing Sheets

(51) Int. Cl.
*H04B 17/391* (2015.01)
*H04B 17/12* (2015.01)
*H04B 17/21* (2015.01)
*H04B 7/06* (2006.01)
*H04L 5/00* (2006.01)
*H04L 25/02* (2006.01)
*H04L 27/26* (2006.01)

(52) U.S. Cl.
CPC .......... *H04B 7/0626* (2013.01); *H04B 17/12* (2015.01); *H04B 17/21* (2015.01); *H04B 17/3912* (2015.01); *H04L 5/0048* (2013.01); *H04L 25/0204* (2013.01); *H04L 25/0224* (2013.01); *H04L 27/2605* (2013.01); *H04L 27/2613* (2013.01); *H04L 5/0007* (2013.01)

(58) Field of Classification Search
CPC .............. H04B 17/3912; H04B 7/0617; H04B 7/0626; H04L 43/12; H04L 43/50; H04L 49/101; H04L 5/0048; H04L 25/0204; H04L 25/0224; H04L 27/2605; H04L 27/2613; H04L 5/00
See application file for complete search history.

(56) References Cited

U.S. PATENT DOCUMENTS

| | | | |
|---|---|---|---|
| 2013/0301759 A1* | 11/2013 | Umeda | H04L 5/0048 375/340 |
| 2016/0212641 A1* | 7/2016 | Kong | H04B 17/0087 |
| 2016/0353289 A1* | 12/2016 | Joung | H04W 24/02 |
| 2017/0141899 A1* | 5/2017 | Lu | H04B 7/0452 |
| 2018/0062971 A1* | 3/2018 | Kyosti | H04L 43/50 |
| 2018/0069615 A1* | 3/2018 | Ma | H04B 7/0689 |

* cited by examiner

Time domain, OFDM symbols 25

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | 1 | 7 | | ... | | | 37 | 1 | 7 | | ... | | | 37 |
| 2 | 2 | 8 | | | | | | 2 | 8 | | | | | |
| 3 | | | | ⋱ | | | | | | | ⋱ | | | |
| 4 | ⋮ | ⋮ | | | | | ⋮ | ⋮ | ⋮ | | | | | ⋮ |
| 5 | | | | | | | | | | | | | | |
| 6 | 6 | 12 | | ... | | | 42 | 6 | 12 | | ... | | | 42 |
| 7 | 1 | 7 | | ... | | | 37 | 1 | 7 | | ... | | | 37 |
| 8 | 2 | 8 | | | | | | 2 | 8 | | | | | |
| 9 | | | | ⋱ | | | | | | | ⋱ | | | |
| 10 | ⋮ | ⋮ | | | | | ⋮ | ⋮ | ⋮ | | | | | ⋮ |
| 11 | | | | | | | | | | | | | | |
| 12 | 6 | 12 | | ... | | | 42 | 6 | 12 | | ... | | | 42 |

Frequency domain, subcarriers 26

Fig. 5

OVER-THE-AIR CHANNEL STATE INFORMATION ACQUIREMENT FOR A MASSIVE MIMO CHANNEL EMULATOR WITH OVER-THE-AIR CONNECTION

This application claims the benefit of U.S. Provisional Application No. 62/327,753, filed on Apr. 26, 2016.

FIELD OF INVENTION

This invention relates to the acquiring of the Over-The-Air (OTA) Channel State Information (CSI) for a channel emulator in order to test a large-scale Multi-User Multiple-Input Multiple-Output (MU-MIMO) wireless communication system.

BACKGROUND

The demand of mobile data is continuing to grow at a fast rate. In order to meet this demand, the wireless industry requires solutions that can achieve a high-order of spatial reuse of limited spectral resources. MIMO, especially large-scale MU-MIMO that is often referred to as massive MIMO, is one efficient method to increase spatial re-use of wireless spectrum. In a wireless communication system, a wireless node with multiple antennas, e.g., a Base-Station (BS) or a User-Equipment (UE), can employ beamforming in the downlink (DL) or the uplink (UL) to boost the Signal-to-Noise Ratio (SNR) or Signal-to-Interference-plus-Noise Ratio (SINR), hence the data rate, of the links with other wireless nodes. Applying MU-MIMO, a BS can employ beamforming to serve multiple UEs simultaneously in a time-frequency block, e.g., a Resource Block (RB) in the 3rd Generation Partnership Project (3GPP) Long Term Evolution (LTE) standard, i.e., applying spatial multiplexing to offer capacity growth without the need of increasing the bandwidth. In a large-scale MIMO or massive MIMO system, a BS may be equipped with many tens to hundreds or even thousands of Transmit (Tx) chains and Receive (Rx) chains and simultaneously support tens of UEs in the same RB using beamforming. Let the number of BS Tx and Rx chains be M and the number of simultaneously served UEs on the RB be K. A hardware RF channel emulator capable of emulating M×K channels in real-time is needed. In a Time-Division Duplex (TDD) system, it is desired that such an emulator maintains the reciprocity of the OTA channel so that the BS can estimate the DL OTA channel using UL pilots. This way, the channel estimation in a massive MIMO system scales with K instead of M so that the overhead of channel estimation in a massive MIMO system is substantially reduced. However, in practice, the antennas in a massive MIMO system may be integrated with the RF circuits, i.e., no antenna ports are reserved to connect the BS RF paths to the channel emulator with cables. Even if the BS has antenna ports, it will be a hassle to connect many tens or even more RF ports using cables. In our patent application PCT/US17/18518, circuits and methods for building a MIMO RF channel emulator with OTA connection to the BS were presented. In order to achieve the desired performance of the channel emulator, the OTA channel between the BS and the channel emulator needs to be estimated and equalized. This invention presents a MIMO RF channel emulator that acquires OTA CSI and equalizes the OTA channel between a BS and the MIMO RF channel emulator, for performing channel simulations using RF channel models. It also includes invention for calibrating the MIMO RF channel emulator to maintain reciprocity of the OTA channel between a BS and a plural of UEs.

BRIEF DESCRIPTION OF DRAWINGS

FIG. 5 shows an example of a pilot pattern for a coherence unit with customized pilots.

DETAILED DESCRIPTION OF PREFERRED EMBODIMENTS

Figure 1:
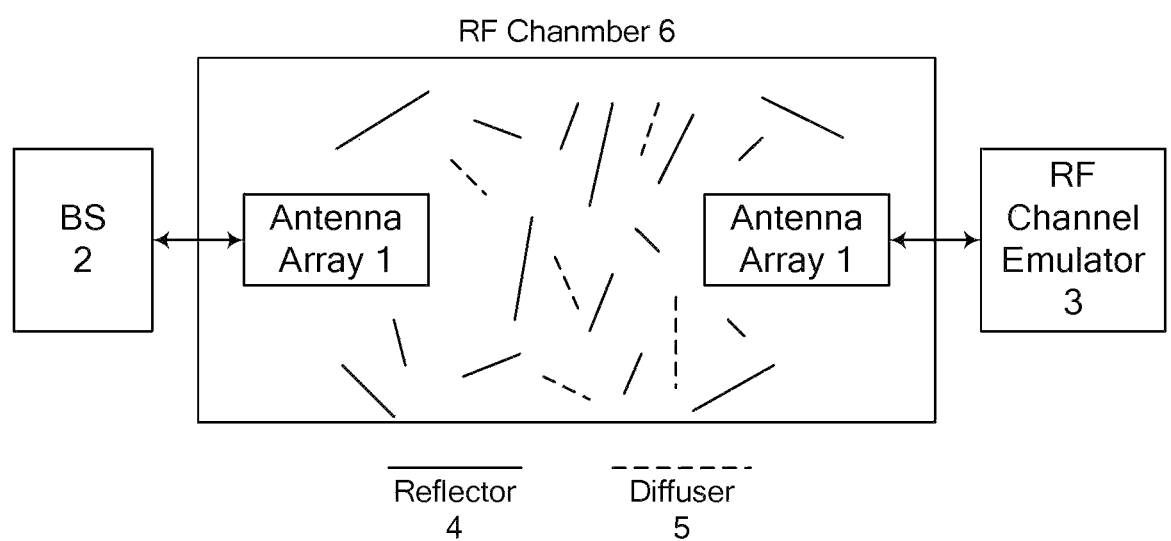
FIG. 1 shows the system configuration for using OTA channels to connect a BS and a RF channel emulator.

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof. Hereafter, a pilot signal may mean a signal transmitted by one antenna for the purpose of estimating the channel between the transmitting antenna and one or more receiving antennas. It may also be called a reference signal, a channel estimation signal or a test signal.

In the following descriptions, an antenna is used to indicate a RF circuit path that includes the RF circuits and the antenna unless indicated by the context otherwise, for example, in a hybrid beamforming system, one RF path may be connected to multiple antenna elements via a beamforming circuit, mostly analog. In such a system, all the antenna elements connected to the same RF path can be treated as a single equivalent antenna in baseband processing.

OTA Channels Connecting BS Under Test and RF Channel Emulator

One way to overcome the lack of antenna ports for connecting cables or the hassle of connecting a large number of cables is to use OTA channels for the connection between a massive MIMO BS and a RF channel emulator, as invented in our patent application PCT/US17/18518. Note that the OTA channels must not reduce the rank of the channel matrix for the channels connecting the BS and UEs.

In a massive MIMO Orthogonal Frequency-Division Multiplexing (OFDM) system, let the number of subcarriers be L and the frequency-domain channel at the lth subcarrier, where l=1, 2, ... L, between the M Tx/Rx paths/antennas on the BS and the K Tx/Rx paths/antennas of the UEs be $H_l$, where $H_l$ is a K×M matrix and it is emulated by the RF channel emulator. In the DL, $y_l^d = H_l x_l^d$, where $y_l^d$ is a K×1 vector of signals received by UEs and $x_l^d$ is an M×1 signals emitting out of the antenna elements of the M Tx paths of the BS. In the UL, $y_l^u = H_l^T x_l^u$ due to the reciprocity of the OTA channels, where $y_l^u$ is an M×1 vector of signals received by the M Rx paths of the BS, and $x_l^u$ is a K×1 signals emitting out of the K antenna elements of UEs.

Furthermore, let the DL channel matrix between the M Tx/Rx paths/antennas on the BS and the N Tx/Rx paths/antennas of the channel emulator be G, where N≥M and G is an N×M matrix. Note that the channel G is assumed to be frequency-flat over the tested system bandwidth and time-invariant during a relatively long time, e.g., seconds or tens of seconds. Therefore, the total DL channel between the BS and UEs with the RF channel emulator in between at the lth subcarrier becomes $H_l F^d G$, where $F^d$ is an M×N matrix, which can be considered as a filter to connect $H_l$ and G.

Due to the reciprocity, the UL channel matrix between the M Tx/Rx paths/antennas on the BS and the N Tx/Rx paths/antennas of the channel emulator is $G^T$. Similar to the DL, the total UL channel between the BS and UEs with the RF channel emulator in between at the lth subcarrier becomes $G^T F^u H_l^T$, where $F^u$ is an N×M matrix.

In order to achieve the desired performance for the channel emulator with the channel $H_l$, the effect of the G matrix needs to be compensated, e.g., by estimating G at the channel emulator and applying the pseudo-inverse of G, which is an M×N matrix denoted by $G^\dagger$, to the channel emulator, i.e., $F^d = G^\dagger$ and $F^u = (G^T)^\dagger = (G^\dagger)^T$. Note that if the G matrix is time-invariant and frequency-flat, then $G^\dagger$ only needs to be calculated once within the system bandwidth. Otherwise, if the G matrix is time-invariant within a period of time, it needs to be estimated before the time invariance expires. In addition, if the G matrix is not frequency-flat, it needs to be estimated and equalized for each coherence bandwidth.

In order for the G matrix to be invertible, it needs to have full rank, i.e., rank of M. To achieve it, reflectors and/or diffusers can be placed between the antenna array of the BS and the antenna array of the RF channel emulator to create a G matrix with the required rank, as described in our patent application PCT/US17/18518. In FIG. 1, the antenna array 1 of the BS 2, the antenna array 1 of the RF channel emulator 3, and the reflectors 4 and/or diffusers 5 placed between them for creating multipath components are placed inside a RF chamber 6 that isolates the equipment and channels from the outside environment so that the channel G is time-invariant and frequency-flat or has a sufficiently long coherence time and a sufficiently large coherence bandwidth. In addition, it is preferred that the G matrix has a relatively small condition number to avoid an extremely huge range of elements in $G^\dagger$, which results in the loss of resolution for fix-point numbers used in the hardware.

Figure 2:
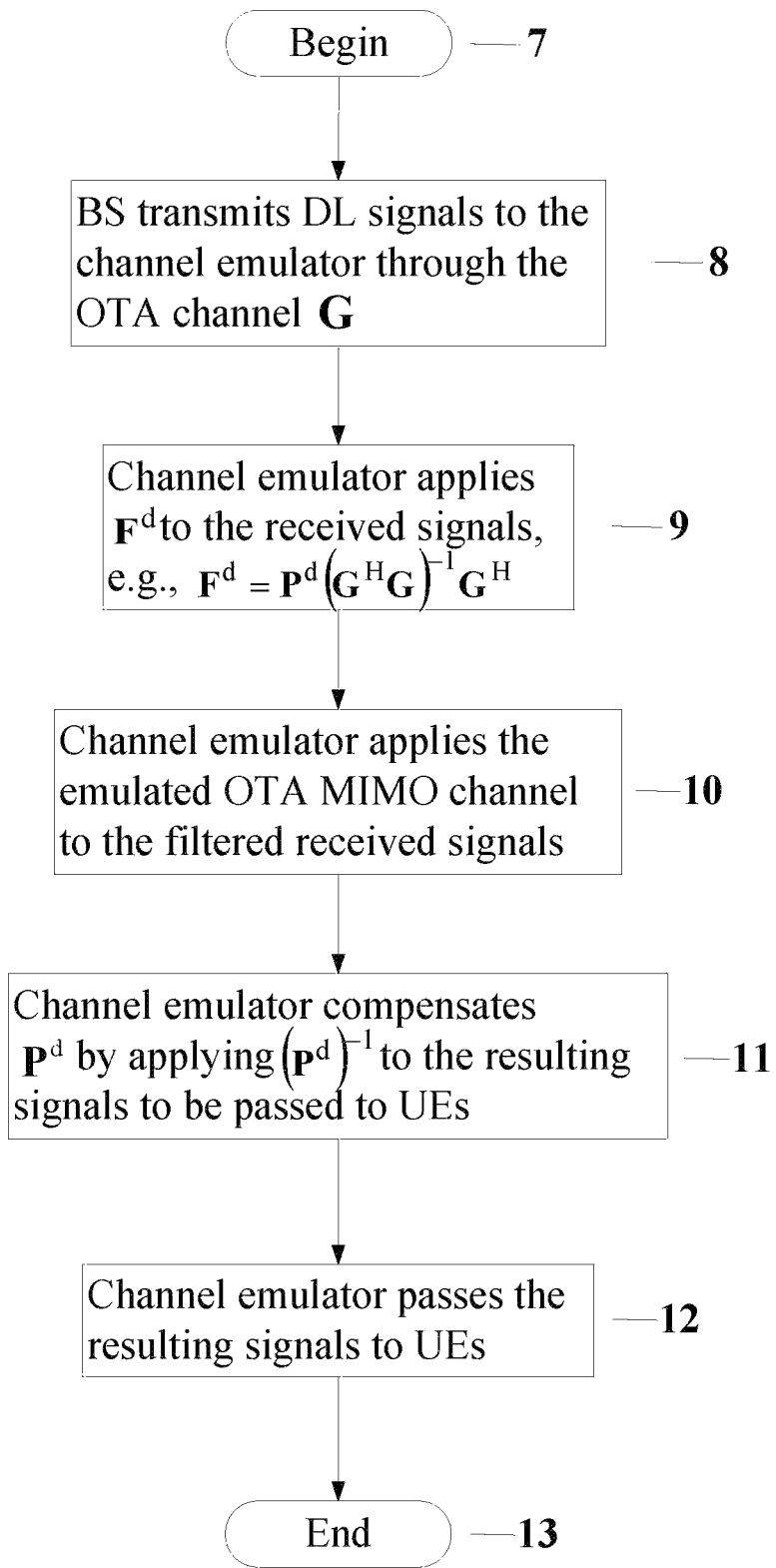
FIG. 2 shows the process of equalizing the OTA channel between the BS and the RF channel emulator in the DL.
Figure 3:
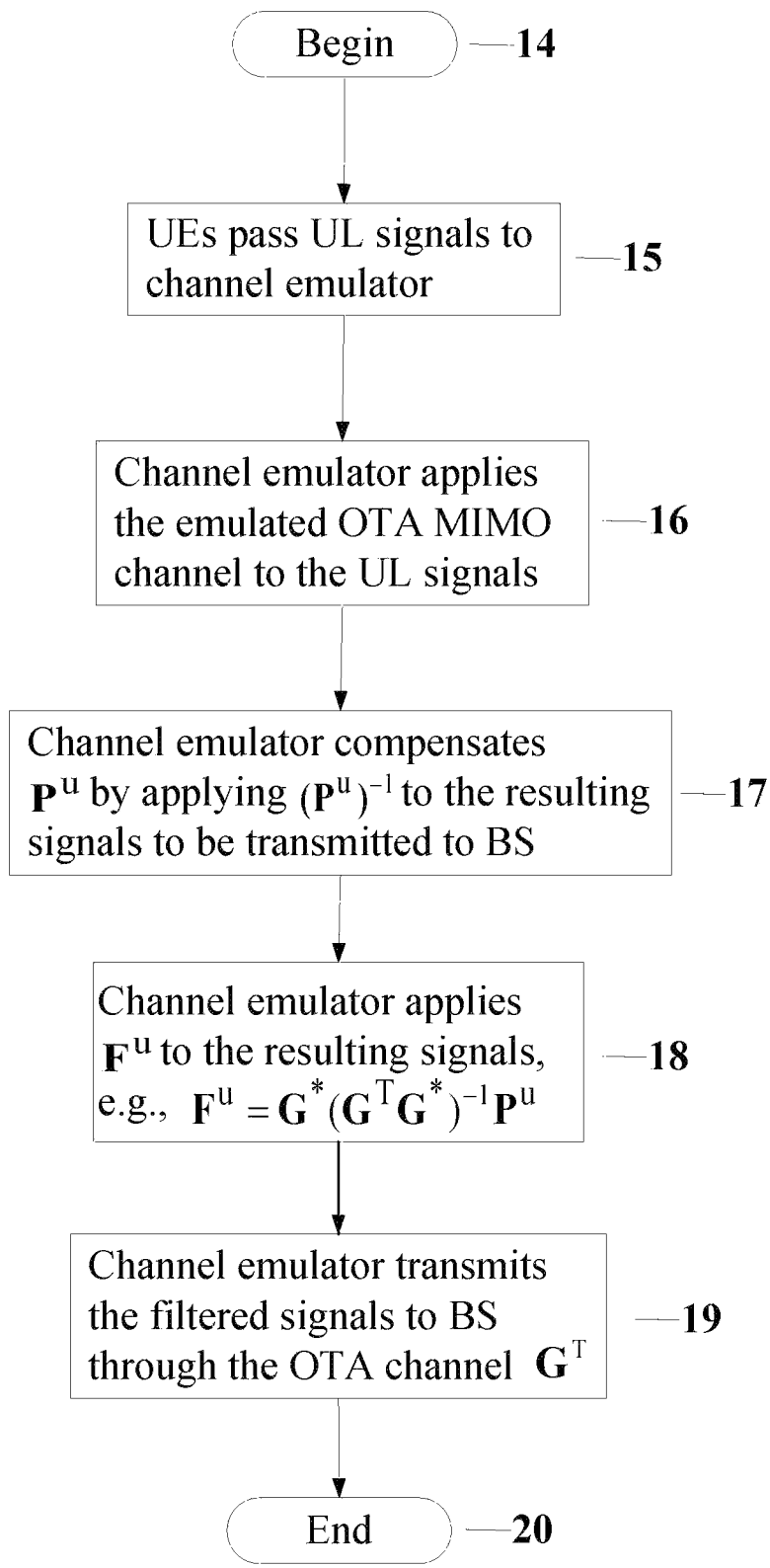
FIG. 3 shows the process of equalizing the OTA channel between the BS and the RF channel emulator in the UL.

In practice, due to the hardware power constraints, the exact $G^\dagger$ is hard to be applied. In one embodiment, a modified version of the $G^\dagger$ matrix that satisfies the hardware power constraints is applied. Specifically, $F^d = P^d G^\dagger$ for the DL and $F^u = (G^\dagger)^T P^u$ for the UL, where $P^d$ and $P^u$ are two M×M diagonal matrices to satisfy the hardware power constraints for the DL and the UL respectively. Since $F^d$ and $F^u$ are calculated based on the estimation of G at the channel emulator, $P^d$ and $P^u$ are known to the channel emulator. Hence, in order to achieve the desired performance of the channel emulator with the channel $H_l$, in one embodiment, the channel emulator further compensates $P^d$ and $P^u$ when emulating $H_l$. FIG. 2 summarizes the process of equalizing the OTA channel between the BS and the RF channel emulator in the DL. Specifically, after the process begins 7, the BS transmits the DL signals to the channel emulator through the OTA channel G 8. Then, the channel emulator applies $F^d$ to the received signals, e.g., $F^d = P^d G^\dagger$ 9. Next, the channel emulator applies the emulated OTA MIMO channel to the filtered received signals 10. After it, the channel emulator compensates $P^d$ by applying $(P^d)^{-1}$ to the resulting signals to be passed to UEs 11. Finally, the channel emulator passes the resulting signals to UEs 12, before the process ends 13. FIG. 3 summarizes the process of equalizing the OTA channel between the BS and the RF channel emulator in the UL. Specifically, after the process begins 14, the UEs pass the UL signals to the channel emulator 15. Then, the channel emulator applies the emulated OTA MIMO channel to the UL signals 16. Next, the channel emulator compensates $P^u$ by applying $(P^u)^{-1}$ to the resulting signals to be transmitted to the BS 17. After it, the channel emulator applies $F^u$ to the resulting signals, e.g., $F^u = (G^\dagger)^T P^u$ 18. Finally, the channel emulator transmits the filtered signals to the BS through the OTA channel $G^T$ 19, before the process ends 20.

When the channel between the BS and the channel emulator is frequency-selective, within a frequency resource whose bandwidth is narrower than the coherence bandwidth, the frequency-domain channel matrix is G, and the matrices $F^d$ and $F^u$ are calculated and applied in the frequency domain.

Similarly on the side of the RF channel emulator that connects to the BS, OTA channels can be used to connect the RF channel emulator with the UEs. As described in our patent application PCT/US17/18518, the UEs can also be placed inside a RF chamber that isolates the equipment and channels from the outside environment. Similarly, reflectors and/or diffusers are placed between the RF channel emulator and the UEs to make the channel matrix full rank and with a relatively small condition number, and the effect of this channel matrix can be removed by estimating the channels and having the RF channel applying the inverse matrix. In practice, since the number of RF circuit paths for connecting to UEs is much smaller than the number of RF circuit paths on the massive MIMO BS side, cable connections can be used for connecting the RF channel emulator to the UEs.

Instead of applying the Zero-Forcing (ZF) method $F^d = P^d G^\dagger$ for the DL and $F^u = (G^\dagger)^T P^u$ for the UL to equalize the effect of G, other methods can be applied as well such as the Minimum Mean Square Error (MMSE) method where $F^d = P^d (G^H G + \alpha^d I_M)^{-1} G^H$ for the DL and $F^u = [(G^H G + \alpha^u I_M)^{-1} G^H]^T P^u$ for the UL with $I_M$ being the M-dimensional identity matrix and $\alpha^d > 0$ and $\alpha^u > 0$ being two design parameters for the DL and UL respectively, e.g., $\alpha^d = 1/\gamma^d$ and $\alpha^u = 1/\gamma^u$ where $\gamma^d$ and $\gamma^u$ denote the SNR for the DL and UL respectively.

In FIG. 1, the BS and RF channel emulator are placed outside of the RF chamber, but they can also be placed inside the RF chamber if power supply is available. Furthermore, the UEs can also be placed inside the RF chamber.

OTA CSI Estimation of Channel Between BS and RF Channel Emulator

Figure 4:
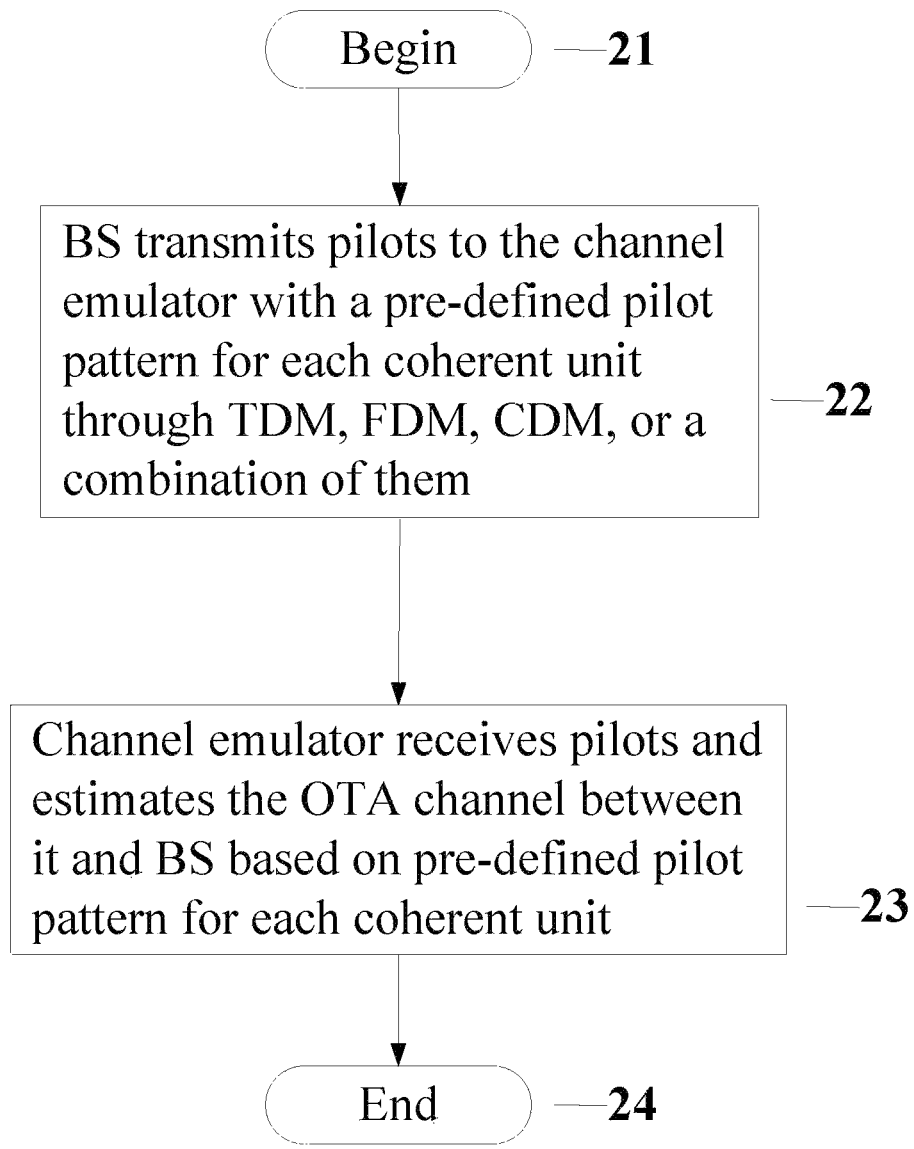
FIG. 4 shows the process of estimating the channel between the BS and the RF channel emulator.

To measure the M×N matrix G, each of the M antennas at the BS needs to transmit pilots. Since the number of M is large, the number of pilots is also large. One embodiment generates a RF chamber and configuration that produce a large coherence bandwidth of the channel between the BS and the channel emulator by controlling the delay spread in the specially designed RF chamber, and a long coherence time of this channel by isolating the setup from outside environment and fixing the antenna arrays of the BS and the channel emulator. As a result, in one embodiment, pilots of all BS antennas are multiplexed within a coherence unit with the coherence time $T_c$ and coherence bandwidth $B_c$, through Time-Division Multiplexing (TDM), Frequency-Division Multiplexing (FDM), Code-Division Multiplexing (CDM), or the combination of these three methods. Then, each of the N antennas of the channel emulator can estimate the G matrix based on the pre-defined pilot pattern. FIG. 4 summarizes the process of estimating the OTA channel between the BS and the RF channel emulator. After the process begins 21, the BS transmits pilots to the channel emulator with a pre-defined pilot pattern for each coherent unit through TDM, FDM, CDM, or the combination of them 22. Then, the channel emulator receives the pilots and estimates the OTA channel between it and the BS based on the pre-defined pilot pattern for each coherent unit 23, before the process ends 24.

One embodiment is that in the pre-defined pilot pattern for a coherence unit, each BS antenna at least transmits two pilots with the same time index but with two different frequency indices, e.g., in the same OFDM symbol but at two different subcarriers in LTE, to compensate the time offset using methods described in our patent application PCT/US15/56500.

One embodiment is that in the pre-defined pilot pattern for a coherence unit, each BS antenna at least transmits two pilots with the same frequency index but with two different time indices, e.g., at the same subcarriers but in two different OFDM symbols in LTE, to compensate the frequency offset using methods described in our patent application PCT/US15/56500.

In one embodiment, the BS transmits the downlink pilots with the signals defined in its supporting standard, e.g., Cell-specific Reference Signals (CRS), UE-specific Reference Signals (DM-RS), Positioning Reference Signals (PRS), CSI Reference Signals (CSI-RS), Multicast-Broadcast Single Frequency Network (MBSFN) reference signals, or synchronization signals in LTE/LTE-Advanced (LTE-A).

In another embodiment, the BS transmits customized pilots. FIG. 5 shows an example of a pilot pattern for a coherence unit with customized pilots. In this example, two RBs in LTE with 14 time-domain OFDM symbols 25 and 12 frequency-domain subcarriers 26 consist the pilot pattern to estimate the OTA channel between the BS and the channel emulator for a large coherence unit, e.g., with 140 OFDM symbols and 600 subcarriers, and a BS with 42 antennas is under test where the number in each time-frequency square indicates the index number of the antenna. Note that FIG. 5 just shows a simple example to illustrate the concept. Since the OTA channel between the BS and the channel emulator is expected to have a very large coherence unit, a pilot pattern supporting more BS antennas, e.g., 256, can be properly designed accordingly.

Figure 6:
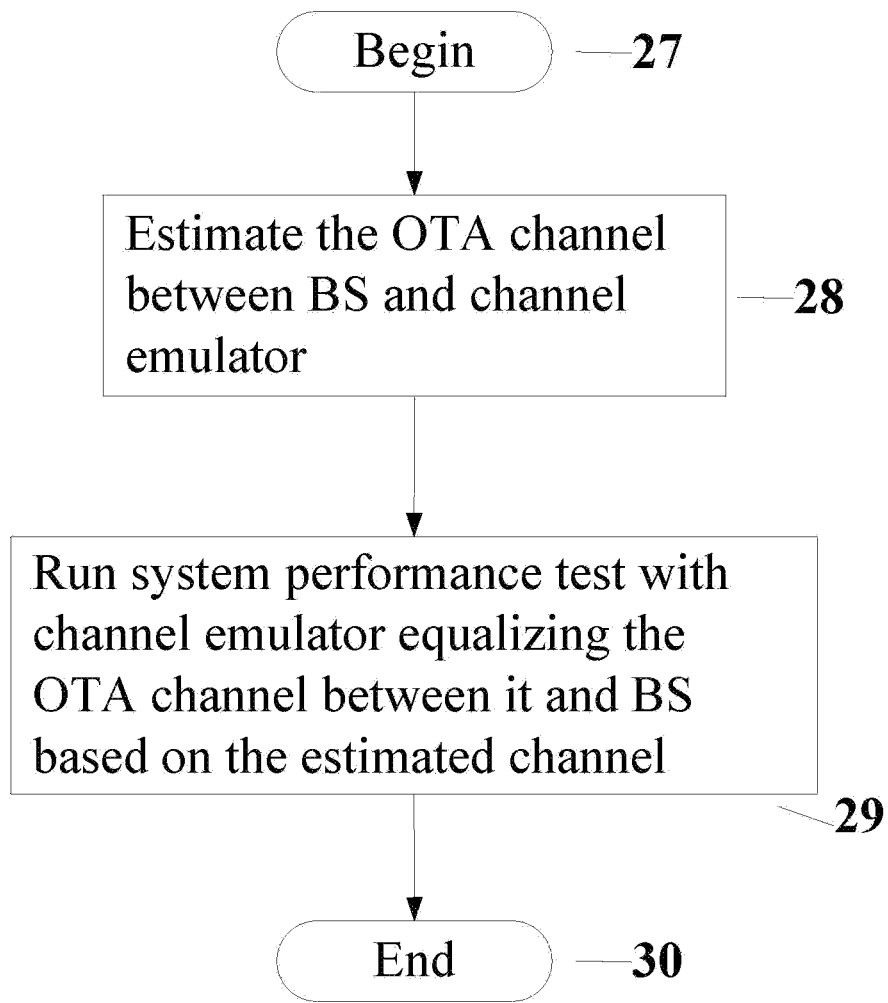
FIG. 6 shows the process of system performance test with OTA channel between the BS and the RF channel emulator estimated off-line.

In one embodiment, the OTA channel between the BS and the channel emulator is estimated off-line, i.e., it is estimated once before the system performance test designed between the BS and UEs and used through the whole test. FIG. 6 shows the process of system performance test with OTA channel between the BS and channel emulator estimated off-line. After the process begins 27, the OTA channel between the BS and the channel emulator is estimated 28. Then, the system performance test runs with the channel emulator constantly equalizing the OTA channel between it and the BS based on the estimated channel 29 until the testing process ends 30.

Figure 7:
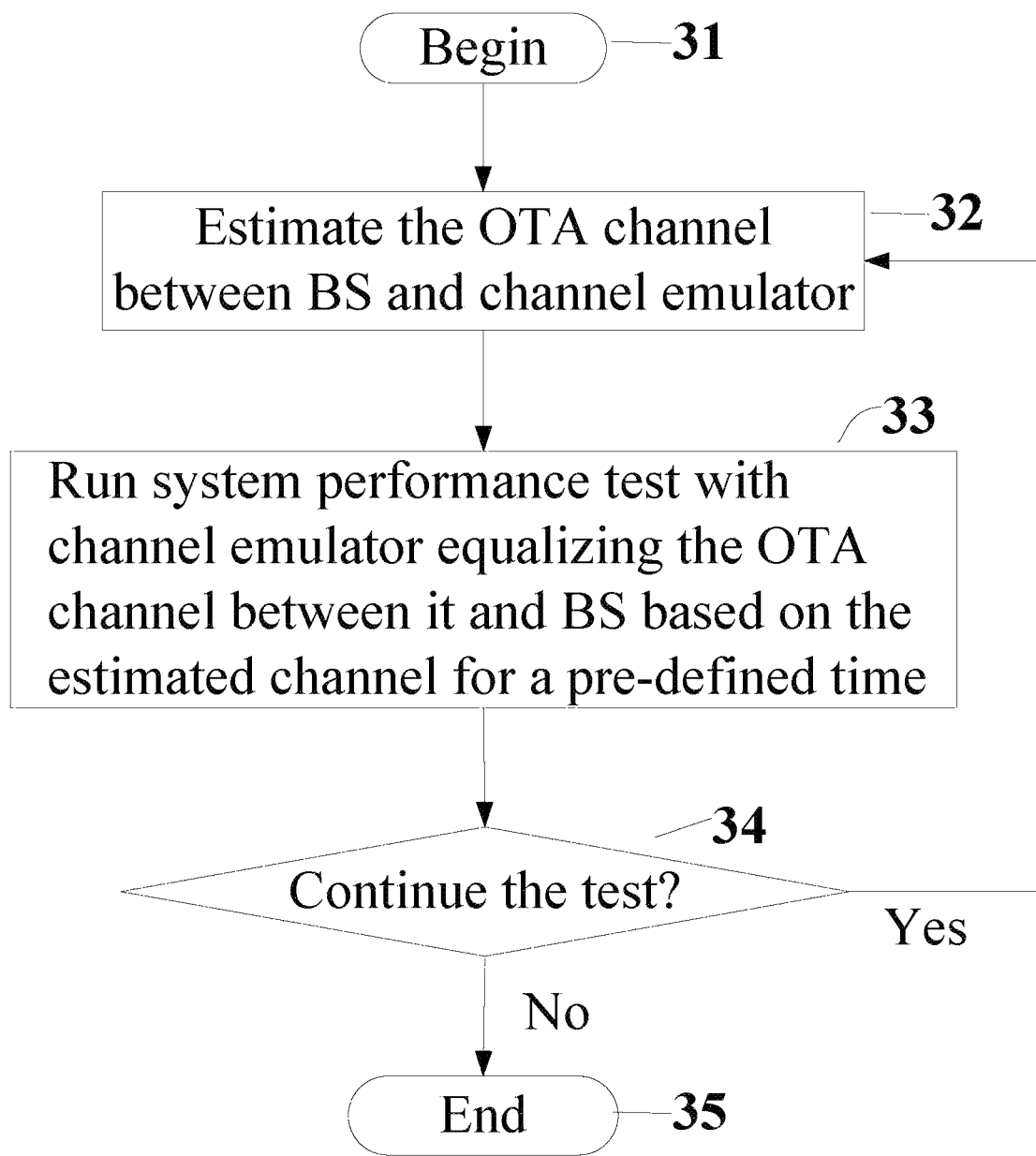
FIG. 7 shows the process of system performance test with OTA channel between the BS and the RF channel emulator estimated on-line.

In another embodiment, the OTA channel between the BS and the channel emulator is estimated on-line, i.e., it is estimated once before the system performance test designed between the BS and UEs and updated periodically through the whole test, which is suited for tests with relatively long times, e.g., hours, or even days. FIG. 7 shows the process of system performance test with OTA channel between the BS and channel emulator estimated on-line. After the process begins 31, the OTA channel between the BS and the channel emulator is estimated 32. Then, the system performance test runs with the channel emulator constantly equalizing the OTA channel between it and the BS based on the estimated channel for a pre-defined time 33. After the pre-defined time, whether the test continues or not is examined 34. If the test continues, then the process jumps back to 32 and continues. If the test does not continue, then the process ends 35.

Figure 8:
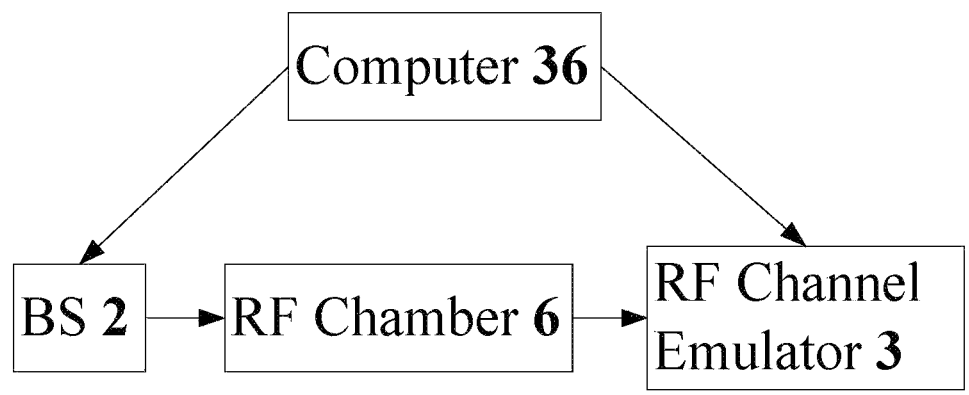
FIG. 8 shows the BS and the RF channel emulator being synchronized by a computer that connects both of them.

One embodiment is that the BS and the channel emulator are synchronized by a testing computer that has interfaces connecting both of them. FIG. 8 shows the BS 2 and the RF channel emulator 3 being connected through the proposed RF chamber 6, and being synchronized by a computer 36 that connects both of them wherein the computer sends a synchronizing signal to both the BS and the RF channel emulator. Alternatively, the BS (or the emulator) sends a synchronizing signal to the computer and the computer passes the signal to the emulator (or the BS). Another embodiment is that the BS and the channel emulator are synchronized using OTA signaling, preferably with the BS sending a synchronizing signal to the channel emulator.

Note that when OTA channels are used to connect the RF channel emulator with the UEs, the abovementioned embodiments can be applied as well, replacing the BS with UEs.

For TDD systems, the DL OTA channel G between the BS and the channel emulator is estimated by the above-mentioned methods. In one embodiment, the UL OTA channel between the BS and the channel emulator $G^T$ is automatically acquired based on the estimated DL channel due to the reciprocity of the OTA channel in a TDD system. In another embodiment, it is estimated by the channel emulator sending pre-defined or customized pilots to the BS and the BS estimating the channel then feeding back the estimated CSI to the channel emulator.

For Frequency-Division Duplex (FDD) systems, the DL OTA channel G between the BS and the channel emulator is estimate by the above-mentioned methods. In one embodiment, the UL OTA channel between the BS and the channel emulator is estimated by the channel emulator sending pre-defined or customized pilots to the BS and the BS estimating the channel then feeding back the estimated CSI to the channel emulator. In another embodiment, it can be estimated by applying the OTA reciprocity using the invention described in our patent application PCT/US14/71752.

RF Channel Emulator Reciprocity Calibration

In one embodiment for a TDD system, to maintain the reciprocity of DL and UL channels between the BS and the RF channel emulator, the Tx circuit path and the Rx circuit path of each antenna on the RF channel emulator are calibrated to account for the non-reciprocal Tx and Rx circuit paths.

Specifically, considering the transfer functions of the Tx and Rx paths of antennas on the BS, the channel emulator, and the UEs, the input-output relation at the lth subcarrier for the DL is $y_l^d = R^{ue} H_l F^d R^{ce} G T^{bs} B^{bs} x_l^d$, where $T^{bs}$ is an M×M diagonal matrix including the transfer functions of Tx paths on the BS, $R^{ce}$ is an N×N diagonal matrix including the transfer functions of Rx paths on the channel emulator, $R^{ue}$ is a K×K diagonal matrix including the transfer functions of Rx paths on UEs, and $B^{bs}$ is an M×M diagonal matrix including the calibration coefficients used by the BS to maintain the reciprocity of the OTA channel, i.e., $T^{bs}B^{bs}=\beta^{bs}R^{bs}$, where $R^{bs}$ is an M×M diagonal matrix including the transfer functions of Rx paths on the BS and $\beta^{bs}$ is a complex-valued scalar with unit norm. Note that the matrices $T^{bs}$, $R^{bs}$, $R^{ce}$, $R^{ue}$, and $B^{bs}$ are assumed to be flat and time-invariant. In addition, $\beta^{bs}$ is assumed to have unit norm because the amplitude can be included in the power control matrix of the DL MU-MIMO beamforming. In this case, instead of G, the estimated OTA channel is $R^{ce}GT^{bs}$. Then, $F^d=P^d(R^{ce}GT^{bs})^{\dagger}$ and $y_l^d=\beta^{bs}R^{ue}H_lP^d(T^{bs})^{-1}R^{bs}x_l^d$. After the channel emulator compensates $P^d$, the DL input-output relation becomes $y_l^d=\beta^{bs}R^{ue}H_l(T^{bs})^{-1}R^{bs}x_l^d$.

Based on the analysis above, the frequency-domain DL channel at the lth subcarrier is $\tilde{H}_l^d=\beta^{bs}R^{ue}H_l(T^{bs})^{-1}R^{bs}$. Note that if the OTA connection between the BS and the channel emulator is replaced with ideal cable connection so that G=I, assuming that the channel emulator is calibrated to be ideal so that $R^{ce}=I$, then the frequency-domain DL channel at the lth subcarrier is $\check{H}_l^d=R^{ue}H_lT^{bs}R^{bs}=\beta^{bs}R^{ue}H_lR^{bs}$. Compared the two matrices $\tilde{H}_l^d$ with $\check{H}_l^d$, the only difference is $(T^{bs})^{-1}$, which could result in slight performance difference. However, compared to the performance with the theoretical DL channel $H_l$, both the ideal cable connections and the OTA channel cause similar levels of slight performance differences. In other words, the OTA channels in our embodiments can be equivalent to ideal cable connections between the BS and the channel emulator.

Similarly, the input-output relation at the lth subcarrier for the UL is written as $y_l^u=R^{bs}G^TT^{ce}B^{ce}F^uH_l^TT^{ue}x_l^u$, where $T^{ue}$ is a K×K diagonal matrix including the transfer functions of Tx paths on UEs, $T^{ce}$ is an N×N diagonal matrix including the transfer functions of Tx paths on the channel emulator, and $B^{ce}$ is an N×N diagonal matrix including the calibration coefficients for the antennas on the channel emulator in order to maintain the reciprocity of the OTA channel, e.g., as in our patent applications PCT/US16/41668 and PCT/US17/18518, i.e., $T^{ce}B^{ce}=\beta^{ce}R^{ce}$, where $\beta^{ce}$ is a complex-valued scalar with unit norm. Note that the matrices $T^{ue}$, $T^{ce}$, and $B^{ce}$ are assumed to be flat and time-invariant. In addition, $\beta^{ce}$ is assumed to have unit norm because the amplitude can be included in $P^u$. In this case, instead of $G^T$, the estimated OTA channel is $(R^{ce}GT^{bs})^T$. Hence, $F^u=[(R^{ce}GT^{bs})^{\dagger}]^TP^u$, and $y_l^u=\beta^{ce}R^{bs}(T^{bs})^{-1}P^uH_l^TT^{ue}x_l^u$. After the RF channel emulator compensates $P^u$, the UL input-output relation becomes $y_l^u=\beta^{ce}R^{bs}(T^{bs})^{-1}H_l^TT^{ue}x_l^u$.

Based on the analysis above, the frequency-domain UL channel at the lth subcarrier is $\tilde{H}_l^u=\beta^{ce}R^{bs}(T^{bs})^{-1}H_l^TT^{ue}$. Note that if the OTA connection between the BS and the channel emulator is replaced with ideal cable connection so that G=I, assuming that the channel emulator is calibrated to be ideal so that $T^{ce}=I$, then the frequency-domain UL channel at the lth subcarrier is $\check{H}_l^u=R^{bs}H_l^TT^{ue}$. Compared $\tilde{H}_l^u$ with $\check{H}_l^u$, the only differences are $\beta^{ce}$ and $(T^{bs})^{-1}$. The phase rotation caused by $\beta^{ce}$ does not affect the performance since it is included in the estimated UL channel. As for the difference of $(T^{bs})^{-1}$, it could result in slight performance difference. However, compared to the performance with the theoretical UL channel $H_l^T$, both the ideal cable connection and the OTA channels cause similar levels of slight performance differences. In other words, the OTA channels in our embodiments can be equivalent to ideal cable connections between the BS and the channel emulator.

Note that $\tilde{H}_l^d=\beta^{bs}/\beta^{ce}R^{ue}(T^{ue})^{-1}(\tilde{H}_l^u)^T$. The non-reciprocity caused by $\beta^{bs}/\beta^{ce}R^{ue}(T^{ue})^{-1}$ can be corrected at UEs by using the DL data pilots so that it does not affect the performance of the DL MU-MIMO beamforming conducted at the BS. As a result, after the reciprocity calibration at the channel emulator, the DL and UL channels can be considered as reciprocal.

In one embodiment, a reference pair of Tx and Rx paths of a reference antenna is used in the calibration, e.g., as in our patent applications PCT/US16/41668 and PCT/US17/18518, wherein the reference antenna can be one of the antennas in the antenna array of the RF channel emulator, or a specialized antenna used specifically for the purpose of calibration. In this case, $\bar{\beta}^{ce}=t_r/r_r=|t_r/r_r|\beta^{ce}$, where $t_r$ and $r_r$ denote the transfer functions of the Tx and Rx paths of the reference antenna respectively. As mentioned above, since the amplitude $|t_r/r_r|$ can be included in $P^u$ and further compensated by the channel emulator, it does not need to be compensated to 1. In other words, the amplitudes of $t_r$ and $r_r$ do not need to be compensated to be the same. In addition, as mentioned above, since the phase rotation caused by $\beta^{ce}$ in the UL does not affect the UL performance, it does not need to be compensated to 1. In other words, the phases of $t_r$ and $r_r$ do not need to be compensated to be the same. This shows that in our embodiments, the reference pair of Tx and Rx paths does not need to be calibrated.

In another embodiment, multiple reference pairs of Tx and Rx paths of antennas are used in the calibration, wherein the reference antennas can be multiple antennas in the antenna array of the RF channel emulator, or specialized antennas used specifically for the purpose of calibration. Similar to the single reference antenna case, the amplitudes and phases of each pair of Tx and Rx paths of each reference antenna do not need to be compensated to be the same.

When the UL OTA channel between the BS and the channel emulator is estimated by the channel emulator sending pre-defined or customized pilots to the BS and the BS estimating the channel then feeding back the estimated CSI, the abovementioned reciprocity calibration at the channel emulator can be skipped.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

We claim:

1. A method for testing a multi-user multiple input multiple output (MU-MIMO) wireless communication system comprising:

creating an over-the-air (OTA) connection between antennas of a base station (BS) with M>2 transmitting or receiving paths or antennas and a channel emulator with N>2 transmitting or receiving paths or antennas;

transmitting pilot signals between the M transmitting paths or antennas of the BS and the channel emulator for estimating an N×M channel matrix G between the BS and the channel emulator wherein the pilot signal transmitted from each transmitting path or antenna is made to be separable from the pilot signals transmitted from other transmitting paths or antennas;

receiving the pilot signals, processing the received pilot signals to separate out the pilot signal transmitted by each transmitting path or antenna, and using the pilot signals to estimate the channel matrix G representing the channels between the BS and the channel emulator;

wherein the method further comprises the channel emulator using the estimated channel matrix G to equalize the channel between the BS and the channel emulator when performing emulation of the channels between the BS and a plurality of UEs in MU-MIMO communication.

2. The method in claim 1 wherein the transmitting and receiving paths of the BS are calibrated to achieve MU-MIMO beamforming.

3. A method for testing a multi-user multiple input multiple output (MU-MIMO) wireless communication system comprising:

creating an over-the-air (OTA) connection between antennas of a base station (BS) with M>2 transmitting or receiving paths or antennas and a channel emulator with N>2 transmitting or receiving paths or antennas;

transmitting pilot signals between the M transmitting paths or antennas of the BS and the channel emulator for estimating an N×M channel matrix G between the BS and the channel emulator wherein the pilot signal transmitted from each transmitting path or antenna is made to be separable from the pilot signals transmitted from other transmitting paths or antennas;

receiving the pilot signals, processing the received pilot signals to separate out the pilot signal transmitted by each transmitting path or antenna, and using the pilot signals to estimate the channel matrix G representing the channels between the BS and the channel emulator;

wherein the method further comprises calibrating transmitting and receiving paths of the channel emulator to account for the non-reciprocity of a transmitting circuit and a receiving circuit of the channel emulator so that the channel emulator achieves reciprocity in a downlink channel and uplink channel to model the reciprocal OTA channel between the BS and a plurality of user equipment (UEs) in a Time-Division Duplex (TDD) system.

4. The method in claim 3 further comprising obtaining the estimate of the channel matrix between the BS and the channel emulator in one direction, either downlink or uplink, from the estimate of the channel matrix in the opposite direction by making use of the reciprocity of the channel in a TDD system.

5. The method in claim 1 further comprising transmitting pilot signals in both downlink and uplink directions to obtain the estimate of the channel matrix G between the BS and the channel emulator in the two directions in a Frequency-Division Duplex (FDD) system.

6. The method in claim 1 wherein equalizing the channel between the BS and the channel emulator is achieved by applying a compensation matrix to equalize the effect of the G matrix such that the channel emulator effectively emulates specified channel models between the M transmitting or receiving paths or antennas of the BS and K≥2 transmitting or receiving paths or antennas of the plurality of UEs.

7. The method in claim 1 further comprising applying one or more downlink power constraint filters to downlink signals from the BS to the UEs in equalizing the G matrix to satisfy power constraints in the downlink signals.

8. The method in claim 1 further comprising applying one or more uplink power constraint filters to uplink signals from the UEs to the BS in equalizing the G matrix to satisfy power constraints in the uplink signals.

9. The method in claim 1 further comprising estimating the channel matrix G in the frequency-domain and equalizing the channel between the BS and the channel emulator by applying a compensation matrix in the frequency-domain to equalize the effect of the G matrix such that the channel emulator effectively emulates specified channel models between the M transmitting or receiving paths or antennas of the BS and K≥2 transmitting or receiving paths or antennas of the plurality of UEs.

10. The method in claim 1 further comprising using a radio frequency (RF) chamber and RF configuration to produce a large coherence bandwidth and long coherence time of the channel between the BS and the channel emulator.

11. The method in claim 1 further comprising generating pilot patterns that multiplex the pilot signals for estimating the channel between the BS and the channel emulator through Time-Division Multiplexing (TDM), Frequency-Division Multiplexing (FDM), Code-Division Multiplexing (CDM), or a combination of them.

12. The method in claim 11 further comprising each transmitting path or antenna transmits at least two pilots with the same time index but different frequency indices to compensate an offset.

13. The method in claim 11 further comprising each transmitting path or antenna transmits at least two pilots with the same frequency index but different time indices to compensate an offset.

14. The method in claim 1 wherein a specific time and frequency resource is assigned to each transmitting path or antenna to make the pilot signal transmitted from each transmitting path or antenna separable from the pilot signals transmitted from other transmitting paths or antennas.

15. The method in claim 14 further comprising a receiver using the assigned time and frequency resource of a pilot signal transmitted by each transmitting path or antenna to separate it out from the pilot signals transmitted by other transmitting paths or antennas.

16. The method in claim 14 further comprising assigning two frequency resources to each transmitting path or antenna at a symbol time slot in the time domain for offset correction in estimating the channel between the BS and the channel emulator.

17. The method in claim 14 further comprising assigning an identical frequency resource to each transmitting path or antenna at two symbol time slots in the time domain for offset correction in estimating the channel between the BS and the channel emulator.

18. A method for testing a multi-user multiple input multiple output (MU-MIMO) wireless communication system comprising:

creating an over-the-air (OTA) connection between antennas of a base station (BS) with M>2 transmitting or receiving paths or antennas and a channel emulator with N>2 transmitting or receiving paths or antennas;

transmitting pilot signals between the M transmitting paths or antennas of the BS and the channel emulator for estimating an N×M channel matrix G between the BS and the channel emulator wherein the pilot signal transmitted from each transmitting path or antenna of the BS is made to be separable from the pilot signals transmitted from the other transmitting paths or antennas of the BS;

receiving the pilot signals, processing the received pilot signals to separate out the pilot signal transmitted by each transmitting path or antenna, and using the pilot signals to estimate the channel matrix G representing the channels between the BS and the channel emulator;
wherein the method further comprises creating an OTA connection between the channel emulator and a plurality of UEs with antenna elemnets;
transmitting pilot signals from the antenna elements of the plurality of UEs or transmitting paths or antennas of the channel emulator for estimating the channel between the channel emulator and the plurality of UEs wherein a pilot signal transmitted from an antenna element of the plurality of UEs or transmitted from a transmitting path or antenna of the channel emulator is made to be separable from pilot signals transmitted from the other antenna elements of the plurality of EUs or the other transmitting paths or antennas of the channel emulator;
receiving the pilot signals, processing the received pilot signals to separate out the pilot signal transmitted by each antenna element, or transmitting path or antenna, and
using the pilot signals to estimate the channel matrix between the UEs and the channel emulator.

19. The method in claim 1 further comprising the BS estimating the channel matrix G between the BS and the channel emulator using pilot signals transmitted by the channel emulator to the BS; and the BS feeding back the estimate of the channel matrix G to the channel emulator.

20. The method in claim 1 wherein the pilot signals are transmitted out of the transmitting paths or antennas of the BS to the channel emulator.

21. The method in claim 20 further comprising using downlink signals in radio resources reserved for reference signals in a standard to transmit the pilot signals.

22. The method in claim 1 further comprising using a computer connected to the channel emulator or connected to both the channel emulator and BS to configure and control the testing.

23. A channel emulator for testing a multi-user multiple input multiple output (MU-MIMO) wireless communication system comprising:
an over-the-air (OTA) connection between antennas of a base station (BS) with M>2 transmitting or receiving paths or antennas and the channel emulator with N>2 transmitting or receiving paths or antennas;
receiving RF circuits that receives pilot signals transmitted from the M transmitting paths or antennas of the BS to the channel emulator;
a combination of baseband processing hardware and software that processes the received pilot signals to separate out the pilot signal transmitted by each transmitting path or antenna;
a combination of baseband processing hardware and software that uses the pilot signals to estimate the channel matrix G representing the channels between the BS and the channel emulator; and
a combination of baseband processing hardware and software that uses the estimated channel matrix G to equalize the channel between the BS and the channel emulator when performing emulation of the channels between the BS and a plurality of user equipment (UEs) in MU-MIMO communication, wherein the BS is configured to achieve MU-MIMO beamforming, and the pilot signal transmitted from each transmitting path or antenna is made to be separable from the pilot signals transmitted from other transmitting paths or antennas.

24. A base station (BS) configured for multi-user multiple input multiple output (MU-MIMO) wireless communication comprising:
a radio unit with M>2 transmitting or receiving paths;
an antenna array connected to the M transmitting or receiving paths;
a digital signal interface with a base band processor through which the base band processor controls the M receiving paths to receive pilot signals from the antenna array transmitted by a channel emulator with N>2 transmitting or receiving paths or antennas through an over-the-air (OTA) connection with the BS, separates the pilot signals to identify which transmitting path or antenna of the channel emulator transmitted which pilot signal, uses the separated pilot signals to estimate a channel matrix G representing the channels between the BS and the channel emulator, and feeds back the estimate of the channel matrix to the channel emulator through the M transmitting paths.

* * * * *